Dec. 22, 1964   J. A. STULL   3,162,233
TIRE BUFFING MACHINE
Filed July 30, 1963   5 Sheets-Sheet 2

JOHN A. STULL,
INVENTOR.
By His Attorneys
HARRIS, KIECH, RUSSELL & KERN.

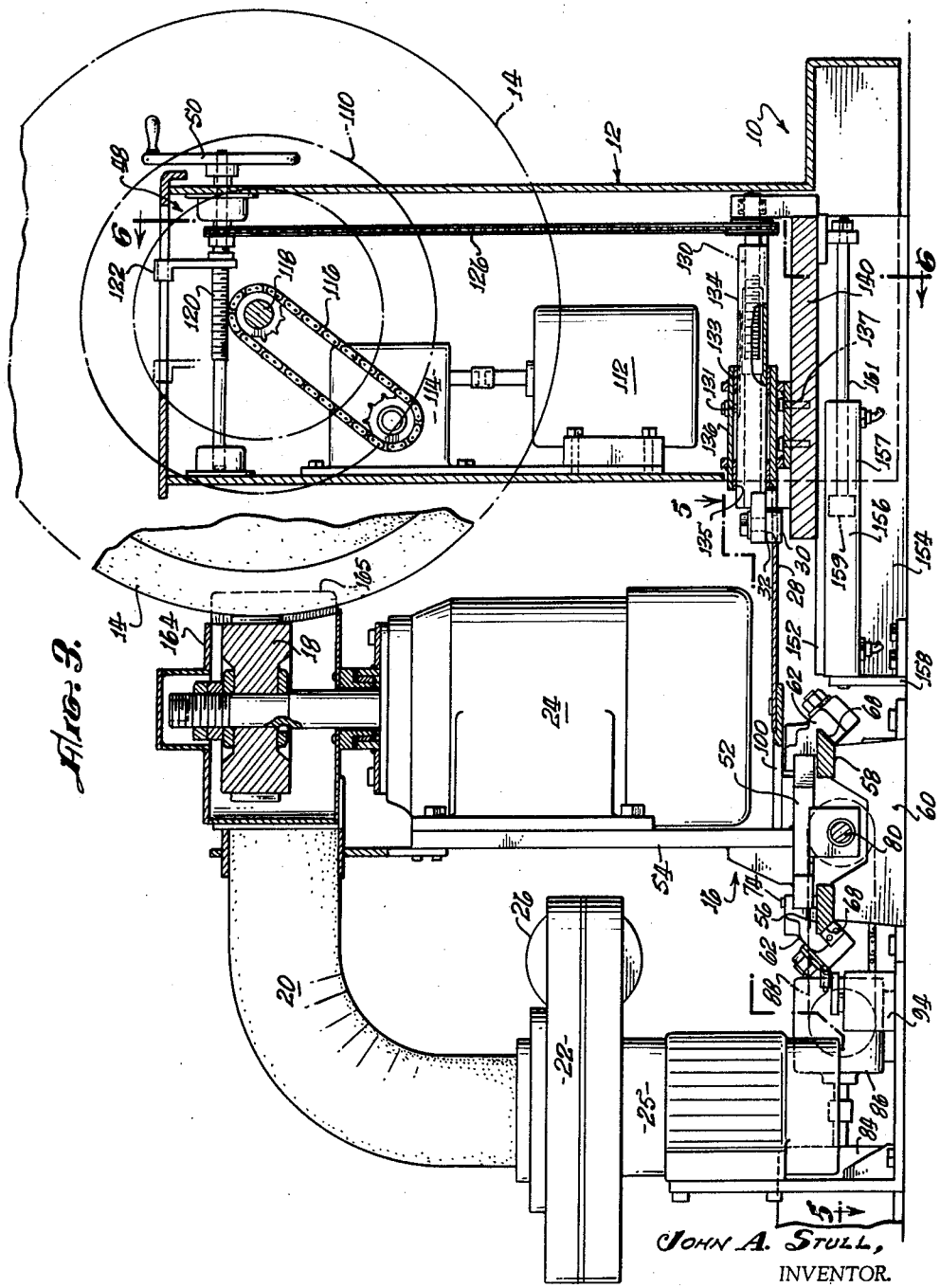

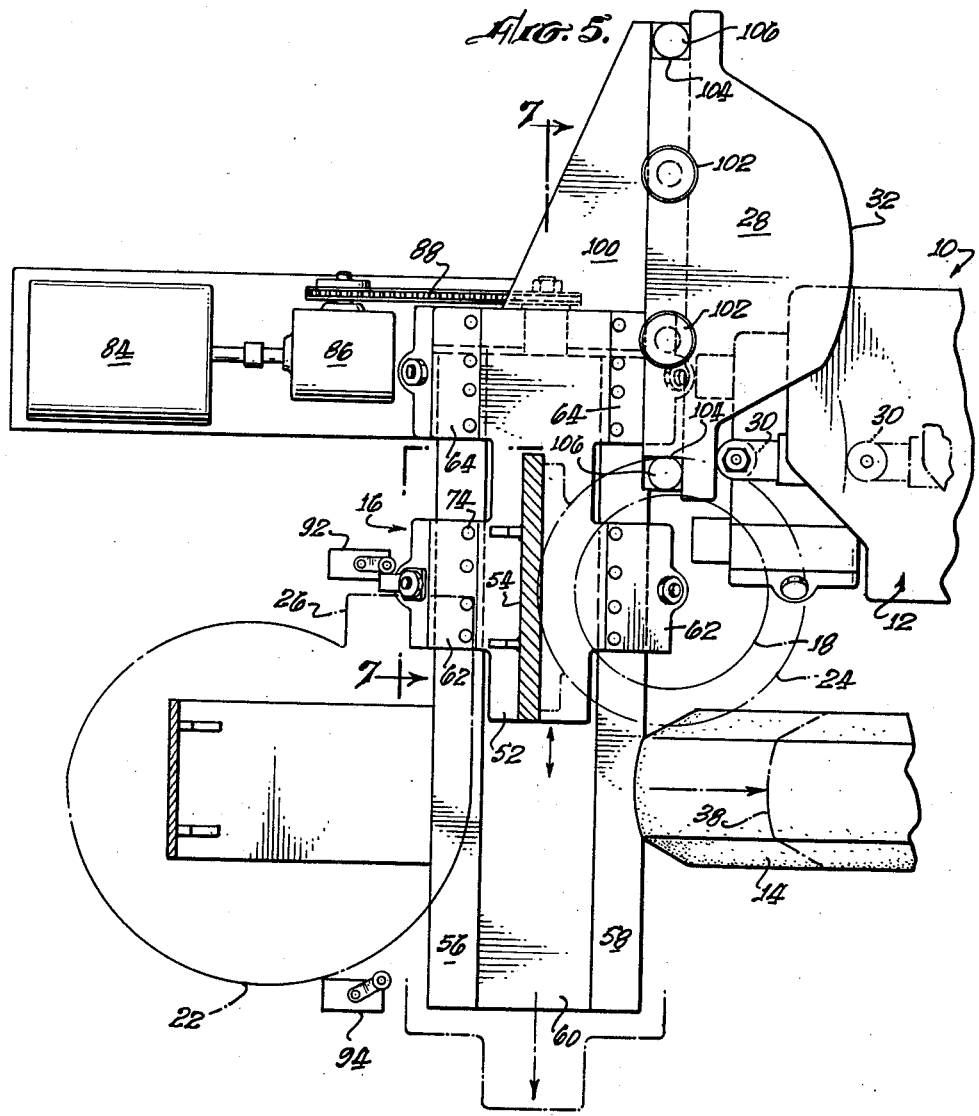

Dec. 22, 1964  J. A. STULL  3,162,233
TIRE BUFFING MACHINE
Filed July 30, 1963  5 Sheets-Sheet 5
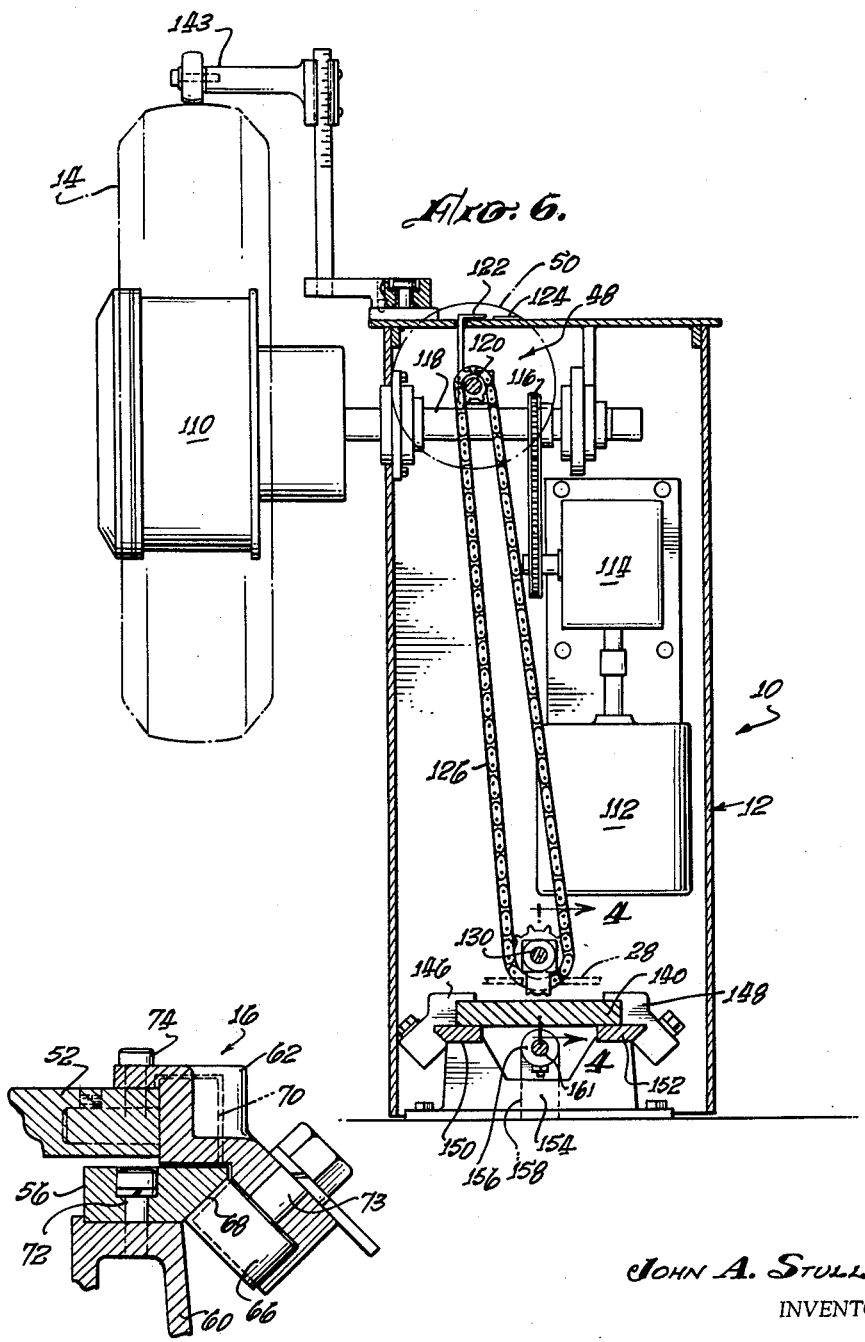
JOHN A. STULL,
INVENTOR.
BY HIS ATTORNEYS
HARRIS, KIECH, RUSSELL & KERN.

United States Patent Office 3,162,233
Patented Dec. 22, 1964

3,162,233
TIRE BUFFING MACHINE
John A. Stull, La Mirada, Calif., assignor to Salsbury Corporation, Los Angeles, Calif., a corporation of California
Filed July 30, 1963, Ser. No. 298,704
15 Claims. (Cl. 157—13)

This invention relates to retreading of tires and in particular to an apparatus for buffing the exterior surface of a tire casing which is to be retreaded.

Tire buffing equipment now commonly in use is semi-automatic in operation and depends to a considerable extent upon the skill of the operator in the efficient removal of rubber. Buffing involves roughening the surface of the worn tire so that a later applied strip of rubber known as a camelback will adhere and provide the proper tire casing profile. Thereafter, the tire casing is vulcanized to integrate the camelback with the casing and to form a tread design.

Some tire buffing equipment presently in use relies on the operator to manually force a buffing wheel against the surface of the casing. Too often, the operator, and this is especially true of an unskilled operator, applies too much force with the result that high friction may cause some burning of the tire casing. It is very difficult for an operator to control the movement of the buffing wheel over the surface of the tire with the required accuracy needed to provide a uniform tire casing profile. A casing with excess rubber removed at places around its periphery will frequently be out of balance following the retreading operation.

It is a principal object of the invention to provide a tire buffing machine which is substantially automatic in its operation.

Another object of the invention is to provide a machine capable of uniformity of operation between successive tires.

A still further object of the invention is to provide a machine which can be relied upon to give uniform results even when operated by an unskilled worker.

Another object of the invention is to provide a machine which will permit the buffing of a tire casing in considerably less time than now commonly required.

A still further object of the invention is to provide a machine that will successively buff tires of the same size to have substantially identical casing profiles.

Another object of the invention is to provide a machine that may be readily adjusted to accept tires of differing cross sections.

Another object of the invention is to provide a machine having a rugged structure which will retain its rigidity throughout long and rough usage to assure uniformity to the tires being processed.

A still further object of the invention is to provide a tire buffing machine possessing a relatively simple structure having minimized operating costs and reduced maintenance.

These and other objects and advantages of the apparatus of the invention will be better understood from the following specification and from the drawings in which:

FIG. 2 is a schematic view of the tire buffing machine of the invention;

FIG. 3 is a longitudinal, sectional view, partly in elevation, taken along line 3—3 of FIG. 1;

FIG. 4 is an enlarged, sectional view, partly in elevation, taken along line 4—4 of FIG. 6;

FIG. 5 is a fragmentary, longitudinal, sectional view taken along line 5—5 of FIG. 3;

FIG. 6 is a vertical, sectional view taken along line 6—6 of FIG. 3;

FIG. 7 is a fragmentary, sectional view taken along line 7—7 of FIG. 5; and

FIG. 8 is an enlarged, fragmentary, cross-sectional view taken along line 8—8 of FIG. 7.

Figure 1:
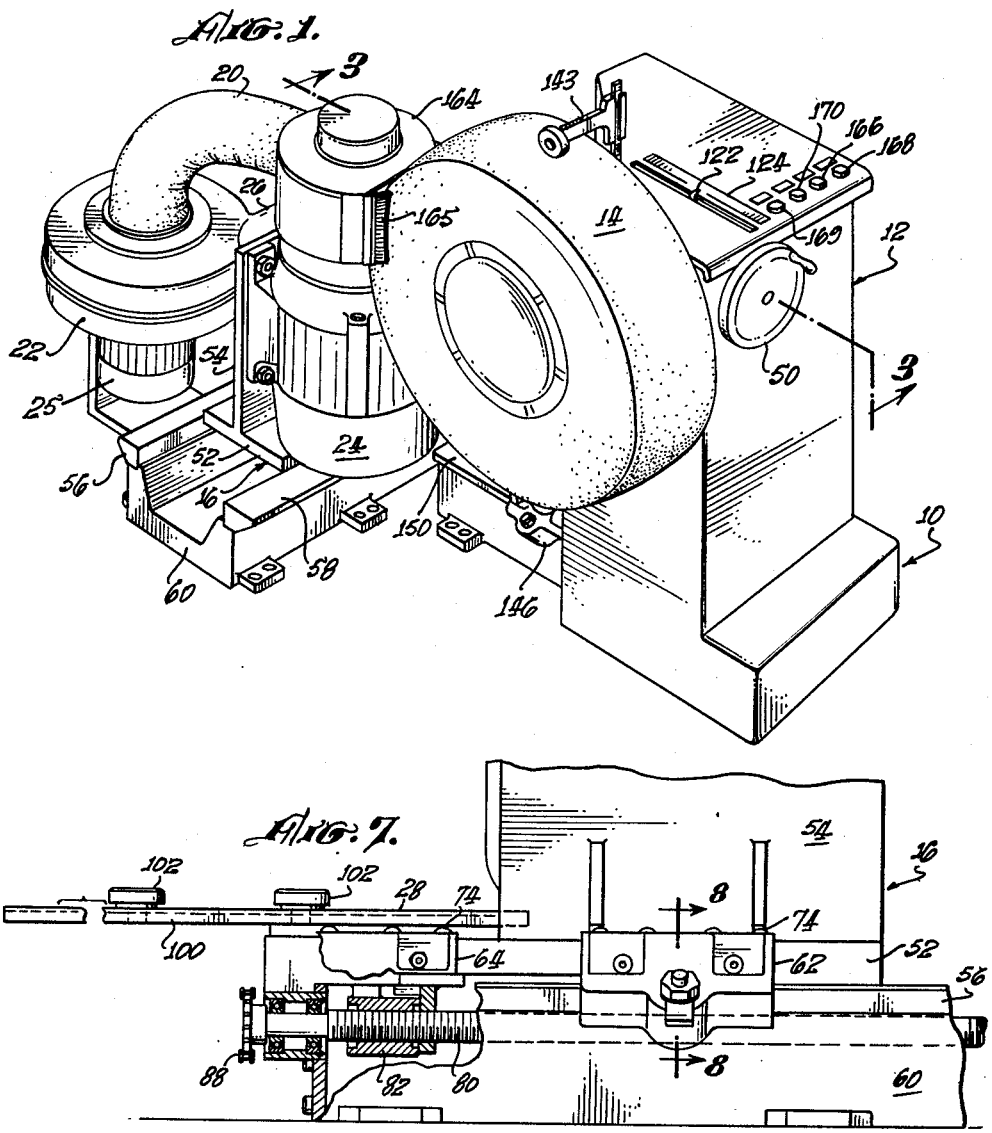
FIG. 1 is a perspective view of a preferred embodiment of the tire buffing machine of the invention.

With reference to the perspective view of FIG. 1 and the schematic view of FIG. 2, it will be seen that the automatic tire buffing machine of the invention comprises a first carriage 10 which is movable longitudinally of the apparatus and which carriage supports a vertical pedestal 12 upon which a tire 14 is rotatably mounted about a horizontal axis. There is provided a second carriage 16 which is movable transversely of the first carriage 10. A rasp or buffing wheel 18 is rotatably mounted about a vertical axis on the transverse carriage 16. The buffing wheel 18 is driven by a motor 24 which may be air driven. The rubber shavings loosened by the buffing wheel 18 are drawn off through a flexible duct 20 by a suction blower 22, which is driven by the motor 25. The discharge from the blower 22 leaves via a conduit 26. The blower 22 and motor 24 are fixed and do not move with the second carriage 16.

The transversely moving buffing wheel carriage 16 supports a template 28 having the profile of the tire casing. A template follower 30 in the form of a roller supported by the tire carriage 10 bears against a camming surface 32 of the profile template 28. The casing profile template 28 may be replaced by other templates for use with tire casings of different cross sections. An examination of the schematic drawing of FIG. 2 will show that the template 28 and follower 30 control the path through which the tire casing 14 moves with respect to the rotating buffing wheel 18 with the transverse movement of the buffing wheel carriage 16. The buffing wheel 18 moves in a straight line and initially occupies the position indicated in full lines in FIG. 2. The movement of the carriage 16 to a central position of its path to occupy the position indicated in the phantom line circle 36 will cause the tire 14 to move to the right of FIG. 2 and occupy position 38. At this time, the cam follower 30 will have moved to position 42. When the cam follower 30 reaches position 44, the buffing wheel 18 occupies position 46 in which position buffing of the sloping side wall of the tire casing 14 occurs. In the preferred manner of operating the buffing machine of the invention, the buffing wheel 18 automatically completes two full passes across the profile of the tire 14 to complete a cycle. An adjusting means 48 is provided for moving the template follower member 30 with reference to its supporting carriage 10 toward and away from the casing profile template member 28. The adjusting means 48 may be regulated manually by a hand wheel 50.

The buffing wheel carriage 16 includes a base plate 52 and an upright, centrally located support plate 54 to which the motor 24 and buffing wheel 18 are fixed. The base plate 52 of the second carriage 16 is slidably supported by spaced rails 56 and 58 of a transversely extending base member 60. The base plate 52 of the carriage is slidably held to the respective rails 56 and 58 by spaced roller brackets 62 and 64 (FIG. 5). The detailed structure of the roller brackets 62 and 64 is illustrated in FIG. 8 wherein it is seen that a first roller 66 engages the under, sloping side 68 of the rail 56. A second roller 70 engages the upper side of the rail 56. The rail 56 is held to the underlying base 60 by several recessed screws 72. The brackets 62 and 64 are fixed to the upper surface of the base plate 52 by screws 74. The roller 66 is rotatably held in place by bolt 73.

The buffing wheel carriage 16 is moved transversely of the tire carriage 10 by a lead screw 80 (FIG. 3) which parallels the two rails 56 and 58 and is disposed therebetween. A lead screw nut 82 threadedly engages the lead screw 80 and is movable lengthwise thereof with turning of the lead screw by a motor 84 through a gear box 86. A chain drive 88 connects the gear box 86 to the lead screw 80. The lead screw nut 82 is fixed to the underside of the base plate 52 of the buffing wheel carriage 16 with the result (FIG. 7) that the turning of the lead screw 80 causes the lead screw nut 82 and the attached base plate 52 to move lengthwise of the rails 56 and 58. The travel of the carriage 16 in the transverse direction is limited by microswitches 92 and 94, see FIG. 5. A short arm 96 of one of brackets 62 trips the respective microswitches 92 and 94 at the ends of the path of travel of the buffing wheel carriage 16.

One end of the base plate 52 of the second carriage 16 carries a support plate 100 (FIG. 5) for the template member 28. The template member 28 is held to the support plate 100 by finger screws 102. The opposite ends of the template 28 (FIG. 5) are notched to provide shoulders 104 which engage location pins 106. The apparatus of the invention is supplied with several template members 28 which permit the use of the machine with tires of different sizes.

Referring to FIGS. 3 and 6, it will be seen that the tire 14 is mounted on a rim 110 and is driven by a motor 112 through a gear box 114, chain drive 116, and shaft 118. The motor 112 and gear box 114 are fixed to an inner face of the pedestal 12.

The means 48 for adjusting the position of the template follower 30 comprises (FIG. 3) a horizontally disposed shaft 120 at the upper end of the pedestal 12. The outer end of shaft 120 supports the hand wheel 50. Turning of the hand wheel 50 causes an indicator 122 which threadedly engages the shaft 120 to move along its scale 124, see FIGS. 1 and 3. The turning of the hand wheel 50 also activates a chain 126 which extends between the shaft 120 and a lower threaded shaft 130 (see FIGS. 3 and 4). An internally threaded sleeve 134 threadedly engages the shaft 130 and is moved lengthwise thereof with turning of the hand wheel 50. The sleeve 134 is keyed by a key 131 against rotation and only moves lengthwise of the shaft 130. The outer end of the sleeve 134 supports the template follower or roller 30. The sleeve 134 is supported by a bracket 136 with bearings 133 and 135 therebetween which bracket is fixed by bolts 137 to the upper face of a base plate 140. The base plate 140 is slidably held by roller brackets 146 and 148 (FIG. 6) respectively to rails 150 and 152 of a base 154. The roller brackets 146 and 148 are similar in structure to that illustrated in FIG. 8 and described above.

The means for urging the tire 14 and the buffing wheel 18 into buffing engagement (FIGS. 3 and 6) and for holding the template roller 30 against the camming surface 32 of the template 28 is an air-actuated piston and cylinder assembly 156. A cylinder 157 of the assembly 156 is held by a bracket 158 to the floor or the base of the apparatus. Piston 159 of the assembly 156 is held by a rod 161 to the underside of the base plate 140 of the tire carriage 10. When the piston 159 is moved to the left of FIG. 3, the tire 14 is brought into contact with the buffing wheel 18. Since air is used for actuating the piston-cylinder assembly 156, the template roller follower 30 may be moved from the initial position of FIG. 2 to position 42 with movement of the transverse carriage 16. A coil spring would serve the same purpose. The tire 14 may be moved wholly out of contact with the buffing wheel 18 by moving the piston 159 and piston rod 161 to the far right of FIG. 3.

The buffing wheel 18 is enclosed (FIG. 1) in a hood 164, the opposite sides of which carry brushes 165 which in the operating position contact the tire 14.

At the outset of a buffing cycle, the tire 14 is out of contact with the buffing wheel 18. With the depression of a starter button 166 at the top of the pedestal 12, the tire 14 is moved by the piston-cylinder assembly 156 into the position illustrated in FIGS. 1, 2, 3, and 5 where the rotating buffing wheel 18 buffs the sloping side of the tire 14 and moves automatically from there to positions 36 and 46 of FIG. 2. When the rotating buffing wheel 18 is in position 36, the tire supporting carriage 10 is forced to the right of FIGS. 1 and 5, placing the rotating tire in position 38. Upon movement of the rotating buffing wheel 18 to the position of 46, the tire is returned by the piston-cylinder assembly 156 to the position illustrated in full lines in FIG. 2. The template 28 and template follower 30 are responsible for moving the tire supporting carriage 10 to the right of FIG. 2 with the movement of the transverse carriage 16. Normally, a buffing cycle is automatically completed when the buffing wheel returns to its initial position. It will be appreciated that the microswitches 92 and 94 may be set to accommodate differing buffing cycles. A button 168 is an emergency button for stopping the apparatus at any time. Depression of a button 169 initiates the inflating of the tire and a button 170 the deflation of the tire. Since the means for inflating and deflating the tire is conventional in nature, it will not be described.

A micrometer 143 supported by the pedestal 12 of carriage 10 enables the operator to gauge the amount of tread possessed by the tire. This reading may be used by the operator in his manipulating of the hand wheel 50 to set the template follower 30 at the desired value indicated on scale 124. Once having set the indicator 123 at the desired setting on scale 124, the subsequent operation of the machine will result in the proper amount of rubber being removed.

Although an exemplary embodiment of the invention has been disclosed herein for purposes of illustration, it will be understood that various changes, modifications, and substitutions may be incorporated in such embodiment without departing from the spirit of the invention as defined by the claims which follow.

I claim:

1. In an apparatus for buffing a tire casing, the combination comprising:
   two carriages with one of the said carriages being movable longitudinally of the apparatus and with the other carriage being movable in a transverse direction thereof;
   means for rotatably mounting a tire casing on one of the two carriages;
   a buffing wheel rotatably supported by the other of the two carriages and movable into buffing engagement with the tire casing;
   a tire casing profile template member and a template follower member with one of said members being supported on one of the carriages and with the other one of said members being carried by the other of the carriages; and
   means urging the template members into engagement.

2. In an apparatus for buffing a tire casing, the combination comprising:
   means for mounting the tire casing for rotation about a horizontal axis and for translatory, horizontal movement along a line perpendicular to the axis of rotation;
   a buffing wheel and means for mounting the wheel for rotation about a vertical axis and for translatory movement along a line transverse to the line of translatory movement of the tire casing;
   a template member and a template follower member with one of said members being supported by one of said mounting means and with the other one of said template members being carried by the other of said mounting means; and
   means for urging the template member and template follower member into engagement.

3. In an apparatus for buffing a tire casing to a desired profile, the combination comprising:
- means for mounting a tire casing for rotation about a horizontal axis and for translatory, horizontal movement along a line perpendicular to the axis of rotation;
- a buffing wheel and means for mounting the wheel for rotation about a vertical axis and for translatory movement along a line transverse to the line of translatory movement of the tire casing; and
- means for presenting successive surfaces of the casing profile to the rotating buffing wheel as said buffing wheel is moved transversely of the tire, said means including a casing profile template and template follower, with one of said template and follower being supported by one of the mounting means and with the other of said template and follower being supported by the other of the mounting means.

4. In an apparatus for buffing a tire casing to a desired profile, the combination comprising:
- a first carriage movable in a horizontal plane lengthwise of said apparatus;
- a second carriage movable in a horizontal plane in a transverse direction of the line of movement of the first carriage;
- means for rotatably mounting a tire casing on one of the two carriages;
- a buffing wheel rotatably supported by the other of the two carriages and lying in a plane including the axis of rotation of the tire casing;
- means for urging the tire casing and buffing wheel into buffing engagement; and
- a tire casing profile template member and a template follower member, said template members controlling the relative paths through which the two carriages move with one of said members being supported on one of the carriages and with the other of said members being carried by the other of the two carriages.

5. In an apparatus for buffing the exterior of a tire casing to a desired profile, the combination comprising:
- means for mounting the tire casing for rotation about a horizontal axis and for translatory, horizontal movement along a line perpendicular to the axis of rotation;
- a buffing wheel and means for mounting the wheel for rotation about a vertical axis and for translatory movement along a line parallel to the line of translatory movement of the tire casing;
- a casing profile template member and a template follower member with one of said template members being supported by one of said tire casing mounting means and buffing wheel mounting means and with the other of said template members being carried by the other of said mounting means; and
- means for urging the tire casing into buffing engagement with said buffing wheel.

6. In an apparatus for buffing a tire casing to a desired profile, the combination comprising:
- means for mounting the casing for rotation about a horizontal axis and for translatory, horizontal movement along a line perpendicular to the axis of rotation;
- a buffing wheel and means for mounting the wheel for rotation about a vertical axis and in a plane including the axis of rotation of said tire casing and for translatory movement along a line transverse to the line of the translatory movement of the tire casing; and
- a tire casing profile template member and a template follower member, said template members controlling the path through which the tire casing moves with respect to the rotating buffing wheel and with one of said template members being supported on one of the two mounting means and with the other of said template members being carried by the other of said mounting means.

7. In an apparatus for buffing a tire casing to a desired profile, the combination comprising:
- means for mounting the tire casing for rotation about a horizontal axis and for translatory, horizontal movement along a line perpendicular to the axis of rotation;
- a buffing wheel and means for mounting the buffing wheel for rotation about a vertical axis and in a plane including the axis of rotation of said tire casing and for translatory movement along a line transverse to the line of the translatory movement of the tire casing;
- a tire casing profile template member and a template follower member, said template members controlling the path through which the tire casing moves with respect to the rotating buffing wheel and with one of said template members being supported on one of the mounting means and with the other of said template members being carried by the other of said mounting means; and
- means for urging the tire casing and buffing wheel into buffing engagement.

8. An apparatus for buffing a tire casing to a desired profile, the combination comprising:
- means for mounting the tire casing for rotation about a horizontal axis and for translatory, horizontal movement along a line perpendicular to the axis of rotation;
- a buffing wheel and means for mounting the buffing wheel for rotation about a vertical axis and for translatory movement along a line transverse to the line of translatory movement of the tire casing;
- means for moving the buffing wheel along its transverse line of movement;
- a casing profile template member and a template follower member with one of said template members being supported by one of said mounting means and with the other of said template members being carried by the other of said mounting means; and
- means for urging the tire and buffing wheel into buffing engagement.

9. An apparatus in accordance with claim 8 wherein the means for urging the tire casing and buffing wheel into buffing engagement comprises an air-actuated, piston-cylinder assembly.

10. In an apparatus for buffing a tire casing to a desired profile, the combination comprising:
- means for mounting the tire casing for rotation about a horizontal axis and for translatory, horizontal movement along a line perpendicular to the axis of rotation;
- a buffing wheel and means for mounting the buffing wheel for rotation about a vertical axis and for translatory movement along a line transverse to the line of translatory movement of the tire casing;
- a tire casing profile template member and a template follower member with one of said members being supported by one of said mounting means and with the other of said template members being carried by the other of said mounting means;
- means for moving the template follower member with respect to its supporting mounting means toward and away from the tire casing profile template member; and
- means for urging the template member and the template follower member into engagement.

11. An apparatus in accordance with claim 10 wherein the means for urging the template member and the template follower member into engagement comprises an air-actuated, piston-cylinder assembly.

12. In an apparatus for buffing a tire casing to a desired profile, the combination comprising:
- a first carriage movable in a horizontal plane lengthwise of said apparatus;
- means for rotatably mounting a tire casing on said first carriage with the axis of rotation of the tire casing being disposed horizontally;
- a second carriage movable in a horizontal plane in a direction transverse to the line of movement of the first carriage;
- a buffing wheel rotatably supported about a vertical axis by the second carriage and with the buffing wheel lying in a plane including the axis of rotation of the tire casing;
- means for moving the second carriage and the buffing wheel mounted thereon in a direction transverse to the line of movement of the first carriage;
- means for urging the tire casing and buffing wheel into buffing engagement; and
- a tire casing profile template member and a template follower member with one of said template members being supported on the first carriage and with the other of said template members being carried by the second carriage.

13. A tire buffing apparatus in accordance with claim 12 wherein an adjusting means is provided for moving the template follower member with reference to its supporting carriage toward and away from the tire casing profile template member.

14. In an apparatus for buffing a tire casing to a desired profile, the combination comprising:
- a first carriage movable in a horizontal plane lengthwise of said apparatus;
- a second carriage movable in a horizontal plane in a transverse direction of the line of movement of the first carriage;
- means for rotatably mounting a tire casing on one of the two carriages with the axis of rotation of the tire casing being disposed horizontally;
- a buffing wheel rotatably supported about a vertical axis on the other one of the two carriages and with the buffing wheel lying in a plane including the axis of rotation of the tire casing;
- means for moving the first carriage along its line of movement;
- means for urging the tire casing and the buffing wheel into buffing engagement; and
- a tire casing profile template member and a template follower member with one of said template members being supported on the first carriage and with the other of said template members being carried by the second carriage.

15. An apparatus in accordance with claim 14 wherein the means for urging the buffing wheel and tire casing into buffing engagement comprises an air-actuated, piston-cylinder assembly.

No references cited.